United States Patent [19]

Mueller

[11] Patent Number: 5,463,764
[45] Date of Patent: Oct. 31, 1995

[54] METHOD AND SYSTEM FOR SYSTEM DEBUGGING THROUGH A KEYBOARD DEVICE DRIVER

[75] Inventor: Ted R. Mueller, Boynton Beach, Fla.

[73] Assignee: International Business Machines Corporation, Armonk, N.Y.

[21] Appl. No.: 319,335

[22] Filed: Oct. 6, 1994

Related U.S. Application Data

[63] Continuation of Ser. No. 862,932, Apr. 3, 1992, abandoned.

[51] Int. Cl.$^6$ .......................... G06F 11/34; G06F 3/023; G06F 19/44
[52] U.S. Cl. ................................ 395/182.13; 364/234.3; 364/234.4; 364/928.3; 364/928.4; 364/928.5; 395/183.03; 395/183.13; 395/183.22; 395/650
[58] Field of Search ........................... 395/575; 364/234, 364/234.1, 234.2, 234.3, 234.4, 928, 928.1, 928.2, 928.3, 928.4, 928.5, 928.6

[56] References Cited

U.S. PATENT DOCUMENTS

| | | | |
|---|---|---|---|
| 4,837,764 | 6/1989 | Russello | 371/16.1 |
| 4,896,290 | 1/1990 | Rhodes et al. | 395/650 |
| 4,926,322 | 5/1990 | Stimac et al. | |
| 4,972,312 | 11/1990 | den Boef | 395/725 |
| 5,121,472 | 6/1992 | Danish et al. | 395/275 |
| 5,339,406 | 8/1994 | Carney et al. | 395/575 |
| 5,357,628 | 10/1994 | Yuen | 395/575 |

OTHER PUBLICATIONS

"Memory Management with Multi–Tasking and Bank Switched Memory," by B. O. Anthony, Jr. et al, IBM Technical Disclosure Bulletin, vol. 31, No. 3, Aug. 1988.
"Method to Use an Alternate Terminal to Debug a Keyboard or Display Device and debugging in Multiple Virtual Environments," by R. R. Russell, et al, IBM Technical Disclosure Bulletin, vol. 29, No. 9, Feb. 1987.

*Primary Examiner*—Robert W. Beausoliel, Jr.
*Assistant Examiner*—Phillip F. Vales
*Attorney, Agent, or Firm*—Bruce D. Jobse; Keith L. Hargrove; Andrew J. Dillon

[57] ABSTRACT

A system and method for providing debugging of a data processing system having a plurality of resources, a keyboard and a multitasking operating system including a plurality of protection domains and a keyboard device driver which executes in a protection domain having maximum access privileges to system resources. A debugging module in the keyboard device driver is provided. Responsive to user selection through a predetermined key stoke sequence, the debugging module may be invoked. Utilizing the debugging module, various system registers and memory locations are accessed and the contents placed in the keyboard input buffer for display on a computer monitor.

6 Claims, 3 Drawing Sheets

5,463,764

METHOD AND SYSTEM FOR SYSTEM DEBUGGING THROUGH A KEYBOARD DEVICE DRIVER

This is a continuation of application Ser. No. 07/862,932, filed Apr. 03, 1992, now abandoned.

BACKGROUND OF THE INVENTION

1. Technical Field

The invention relates to debugging in a multitasking operating environment of a computer system and more particularly to a debugging program execution of which has a minimal effect on operating system timing. Still more particularly, the invention relates to a debugging program which may be entered through the keyboard interrupt without a reboot of the operating system.

2. Description of the Related Art:

Computers, programmed with appropriate application programs, are to most users a tool. Application programs apply to the user's work, such as programs that do inventory control or word processing. However, application programs cannot be directly executed on a general purpose personal computer. An operating system is required between the computer hardware and the application program for controlling the processor which executes instructions, memory which stores instructions and data, and input/output devices through which the computer is programmed and through which it displays results.

An operating system is a collection of related processes on a computer system which provide an environment for the execution of application programs. In a multitasking operating system, as provided by the OS/2® operating system available from International Business Machines Corporation, processes provide a number of tasks such as resource allocation between competing applications, synchronization of data streams and management of data files in memory. Typically, a large part of application program development involves assuring that an application program works with the operating system. One aspect of compatibility is a requirement that certain events occur in proper sequence. In other words, timing must be right.

Application program developers typically use operating systems which include large debugging program modules. For a number of reasons, these debugging program modules are not typically included with operating systems sold with computer systems at retail. Most users would have little use for this module and its presence in the operating system can slow system responsiveness. However, its removal occasionally disrupts timing relationships between application programs and the operating system in unforeseen ways. Thus a user may encounter problems which are not reproducible on a system incorporating the debugging program module.

Application problems with an operating system can appear to the user as a keyboard problem. The problem manifests itself by the computer appearing to refuse inputs from the keyboard, and thus the system appears to "hang up". Frequently, the problem actually lies elsewhere. Accordingly, it would be useful to have a tool which establishes that the keyboard is active without destroying the conditions on the system through a soft reboot of the operating system. The tool should permit evaluation of the keyboard mechanically.

SUMMARY OF THE INVENTION

Thus it is one object of the present invention to provide a debugging module for utilization in a multitasking operating environment.

It is another object of the present invention to provide a debugging program, existence of which among the operating system processes has a minimal effect on operating system timing.

It is still another object to provide a system and method for debugging application programs which may be entered through the keyboard interrupt without a reboot of the operating system.

The foregoing objects are achieved as is now described. A system and method for providing debugging of a data processing system having a plurality of resources, a keyboard and a multitasking operating system including a plurality of protection domains and a keyboard device driver which executes in a protection domain having maximum access privileges to system resources. A debugging module in the keyboard device driver is provided. Responsive to user selection through a predetermined key stoke sequence, the debugging module may be invoked. Utilizing the debugging module, various system registers and memory locations are accessed and the contents placed in the keyboard input buffer for display on a computer monitor.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
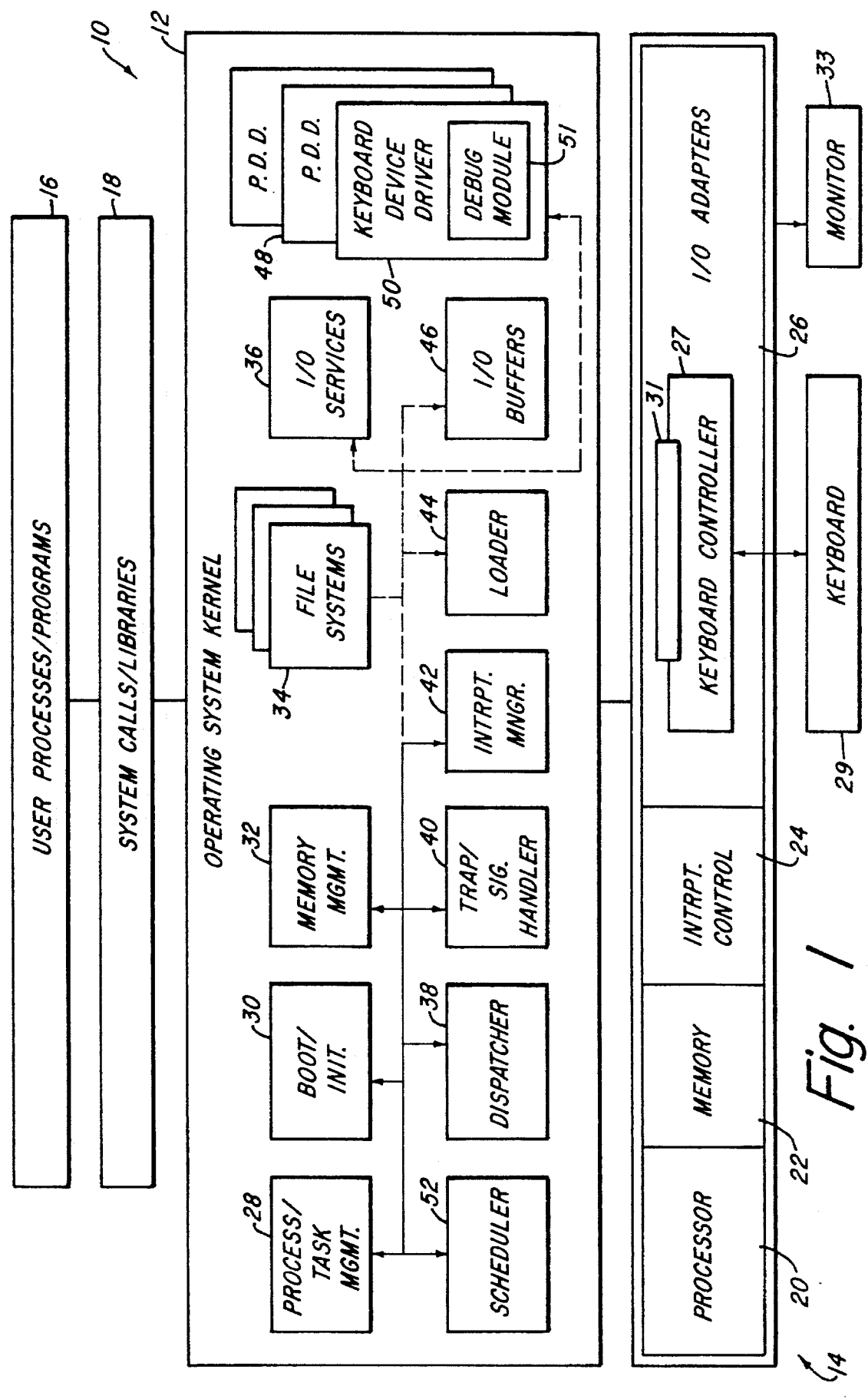
FIG. 1 is a high level block diagram illustrating software and hardware components of a multitasking data processing system which may utilized to implement the method and system of the present invention.

With reference now to the figures and in particular with reference to FIG. 1, there is depicted a high level block diagram illustrating software and hardware components of a data processing system 10 which may be utilized to implement the method and system of the present invention. Data processing system 10 includes an operating system kernel 12 which resides in a hardware system 14. The operating system is preferably provided by a disk operating system such as MS-DOS® version 3.3 or later available from Microsoft Corporation or the OS/2® operating system available from International Business Machines Corporation. Hardware system 14 includes at a minimum a central processing unit (CPU) 20 and a computer memory 22. Hardware system 14 further preferably includes an interrupt controller 24 and input/output adapters 26. Included among input/output adaptors 26 is keyboard controller 27, which operates between the software of operating system kernel 12 and keyboard 29. Keyboard controller 27 is a small dedicated processor having various ports of interest for program debugging.

Also depicted in FIG. 1 are user processes/programs 16 which, in a manner well known to those skilled in the art, access selected procedures within operating system kernel 12 by means of system calls which are depicted at reference numeral 18. As is typical in such systems selected procedures within operating system kernel 12 are designed to be called or invoked by applications within data processing system 10 and thereafter the task will return to the user program which invoked the operating system kernel procedure. In this manner, operating system kernel 12 acts as an interface between the user of data processing system 10 and hardware system 14.

Operating system kernel 12 is utilized to provide an environment in which various processes or programs may be executed. Operating system kernel 12 provides for the efficient utilization and prevents user application programs from interfering with the proper operation of data processing system 10 by controlling the creation and alteration of files, the control of input/output devices and the provision of multiple device drivers which permits data processing system 10 to interface with various external devices.

Still referring to FIG. 1, it may be seen that operating system kernel 12 includes multiple asynchronous subsystems, including process/task management system 28 which is utilized to provide task creation, deletion, status and synchronization functions. Boot/initialization system 30 typically is embodied in microcode in non-addressable memory and is utilized to load the operating system into computer memory 22.

Next, memory management system 34 is depicted. Memory management system 32 allocates and deallocates portions of computer memory 22 for data processing system 10. File systems 34 are preferably utilized to control the creation and deletion of files. A file is simply a named set of records stored or processed as a unit by a data processing system. Another aspect of files typically addressed within an operating system kernel is control of access to the files. Access control is utilized to ensure that an access to a file or directory is checked for correctness. Next, input/output services system 36 is depicted. Input/output services system 36 is preferably a functional unit within operating system kernel 12 which controls peripheral hardware.

Next, dispatcher 38 is depicted within operating system kernel 12. Dispatcher 38 places jobs or tasks into execution. Dispatcher 38 is thus responsible for providing multi-tasking and operates in conjunction with a scheduler to implement a particular type of scheduling system.

Trap and signal handler 40 is also depicted within operating system kernel 12 and is utilized to respond to traps and signals typically activated by hardware system 14. Among the signals generated by hardware 14 are page fault signals indicating operations relating to computer memory 22 and auxiliary memory accessed through I/O adapters 26. Such page fault signals are subdivided into two categories corresponding to the type of memory being accessed. Page reclaim operations relate to a memory paging operation limited to computer memory 22. A page fault requiring I/O operations is the second category. Any auxiliary memory operation requires a relatively large amount of time to execute compared to central processor operation and page reclaims.

Interrupt manager 42 preferably manages interrupt handlers which are set up by the operating system kernel 12 and kernel extensions to take whatever action is necessary to respond to the occurrence of an interrupt. Loader system 44 is also depicted within operating system kernel 12 and, as those skilled in the art appreciate, is typically a routine which loads programs, libraries and kernel extensions. Input/output buffers 46 are depicted within operating system kernel 12 are utilized to temporarily store data during transfer from one hardware device to another in order to compensate for possible differences in data flow rate.

Next, scheduler 52 is depicted. Scheduler orders specific tasks for dispatch to the processor upon indication that a task is "ready to run". Good design of the scheduling algorithm provides both effective use of central processing unit 20 by the various tasks and smooth response to user requests of data processing system 10.

A plurality of device drivers 48 are depicted. Device drivers 48 are typically utilized to attach and use various peripheral devices which may be coupled to data processing system 10. For example, displays, keyboards, printers, floppy disk drives, fixed disk drives and other auxiliary devices are typically controlled from data processing system 10 utilizing a device driver associated with the particular auxiliary device selected for control. Device drivers 48 are installable and operating system kernel 12 is adapted to admit additional and utilize additional units. Among device drivers 48 is a keyboard device driver 50.

Keyboard device driver 50 and keyboard controller 27 provide the software and the hardware components, respectively, of an interface between operating system 12 and keyboard 29. A typical keyboard controller 27 is a small processor having two data ports. Controller 27 provides a keyboard input buffer 31 the contents of which are readable by system 10 for display on a video monitor 33. Incorporated in keyboard device driver 50 is a debugging program module 51. It is through the debugging program module 51 that the user is able to interact directly with keyboard device driver 50 and thereby gains access to data areas and ports open to driver 50. Various data areas and ports are open to keyboard device driver 50 that are not available to higher level application programs.

Figure 2:
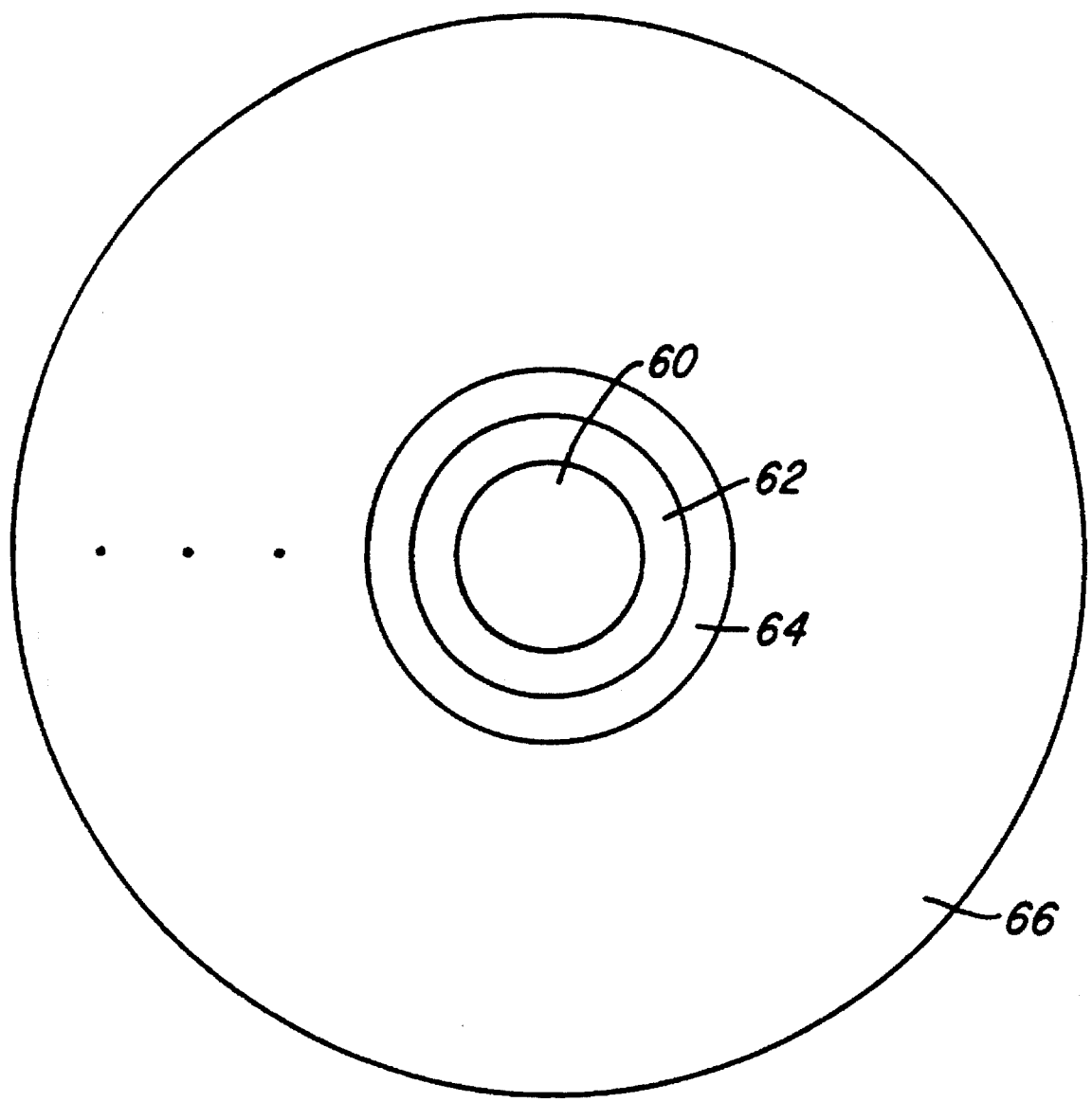
FIG. 2 is a high level block diagram illustrating a domain protection scheme for a multitasking data processing system which may be utilized to implement the method and system of the present invention.

A plurality of processes are concurrent on operating system 12. System operation is generally enhanced if the different processes must be protected from one another. System protection is a mechanism for controlling access by processes to shared resources. FIG. 2 graphically illustrates a protection structure utilized with the OS/2 operating system. A plurality of rings 60–66 define scopes of access to system resources. Ring zone 60 (ring 0) has access to all resources. Ring zone 62 (ring 1) loses some access rights of the ring 0. At each subsequent ring, additional access rights are lost. Keyboard device driver 50 is a process which executes in ring 0, and thus has access to certain ports and data areas not accessible in higher numbered rings. Application programs in the OS/2 operating system typically execute in Ring 3 and thus cannot access certain ports and areas of memory 22 available to the keyboard device driver.

Figure 3:
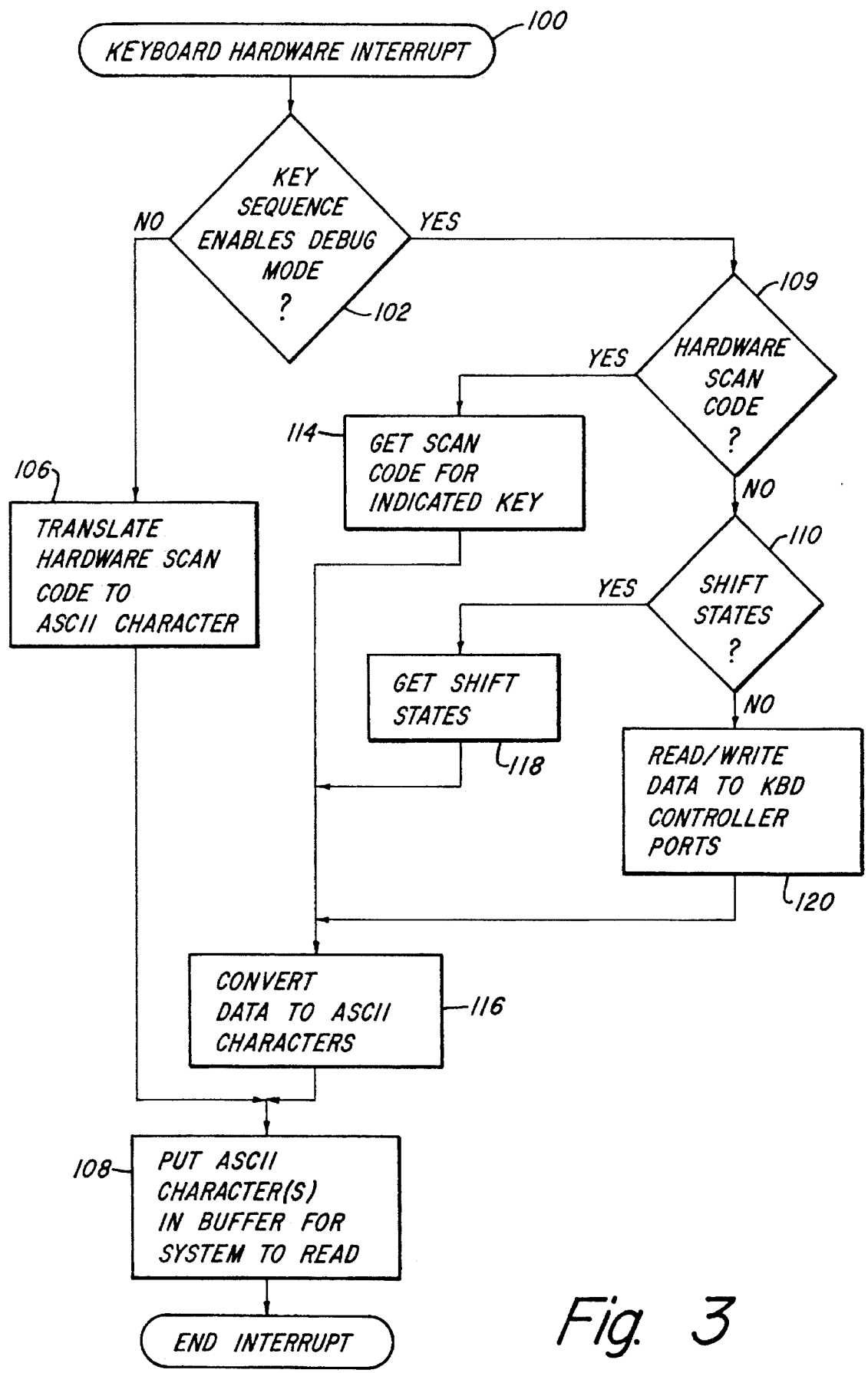
FIG. 3 is a high level block diagram illustrating software implementation of the debugging program module incorporating the method and system of the present invention.

FIG. 3 is a high level logical flow of the processing of a keyboard hardware interrupt by keyboard device driver 50 and debugging program module 51, such as generated when a keystroke or sequence of keystrokes is made by a user. The process is entered at step 100 with receipt of the keyboard hardware interrupt. Step 102 represents a series of comparisons of the sequence of keystrokes received to a predetermined sequence of keystrokes established for enabling debugging program module 51.

Assuming responsiveness to the keyboard interrupt, and where the sequence of keystrokes do not match that required to invoke module 51, the NO branch from step 102 is followed to step 106. Process step 106 represents a conventional keyboard device driver and form no part of the debugging program module 51. Step 106 is executed to translate the hardware scan code from keyboard 29 to its ASCII character code. At step 108 the ASCII character code is placed in keyboard buffer 31 for system 10 to read and display on monitor 33. The interrupt is then concluded.

The debugging program module is entered along the YES branch from step 102. Debugging program module 51 provides a set of options providing viewing and resetting of certain areas of memory 22, registers or ports.

Step 109 is executed to determine if the user wishes to access keyboard scan codes. Scan code is data that relates to utilization of the keys. For a given key one scan code indicates that it has been depressed and a second scan code indicates that a key has been released. Scan codes, standing alone, do not tell you what character will be produced. To determine the appropriate character, you must also determine the shift states of the several control keys of keyboard 29. Scan codes are of interest in determining the presence of mechanical defects in the keyboard. Defective keyboards may also generate inappropriate signals.

Where a user has indicated that access to the scan codes is desired, the process follows the YES branch from step 109 to step 114, which is executed to recover the indicated scan codes. At step 116 the scan code data are converted to ASCII character codes and at step 108 the code is placed into keyboard buffer 31 for system 10 to read. The interrupt is then concluded.

The shift states discussed above may also be examined. At step 110 the process determines if the user has requested access to view the condition of the shift states. If yes, the process executes step 118 to recover the shift states. Again the recovered data is converted to an ASCII representation (step 116) and placed into the keyboard buffer for system 10 to read (step 108).

Of particular importance for debugging and diagnostic purposes are obtaining knowledge of and having the ability to change the contents of the ports of the keyboard controller 27. Along the No branch from step 10 this option is executed. The user may select to read or to change the contents of the keyboard controller 27 ports (step 120). The contents of the ports, or the data written thereto, depending on the user's selection, are converted to ASCII character data at step 116 and placed in the keyboard buffer at step 108 before conclusion of the interrupt.

Many of the problems encountered by users of application problems are not readily reproducible, particularly when it is unclear at the outset whether the problem is a hardware problem or a software problem. The present invention preserves the state of the system during which the problem arose while a minimal debugging program is engaged. The debugging program module is positioned within the system in such a way as to avoid compromise of system performance. The modularity of the debugging program allows its easy removal from the keyboard device driver if so desired.

While the invention has been particularly shown and described with reference to a preferred embodiment, it will be understood by those skilled in the art that various changes in form and detail may be made therein without departing from the spirit and scope of the invention.

What is claimed is:

1. A method of operating a data processing system having a plurality of resources, a keyboard and a multitasking operating system including a plurality of protection domains and a keyboard device driver which executes in a protection domain having maximum access privileges to system resources, the method comprising the steps of:

(A) responsive to a keyboard interrupt, preserving a system state during which a problem arose;

(B) providing a debugging module in the keyboard device driver;

(C) responsive to user selection, invoking the debugging module; and (D) executing the debugging module in the protection domain of the keyboard device driver for reviewing said system state and determining whether said keyboard is active after the occurrence of said problem.

2. A method of operating a data processing system as set forth in claim 1, further comprising the steps of:

invoking the debugging module in response to a predetermined sequence of key strokes;

responsive to user selection, retrieving a keyboard scan code;

responsive to user selection, reading port data from a keyboard controller;

responsive to user selection, retrieving shift states from a data area for the keyboard device driver; and responsive to user selection, writing port data on the keyboard controller.

3. A method of operating a data processing system as set forth in claim 1, the method further comprising:

retrieving data from a selected system register, port or area of a memory through the keyboard device driver;

placing the retrieved data into a keyboard input buffer; and displaying the contents of the keyboard input buffer to the user.

4. A data processing system comprising:

a plurality of resources;

a keyboard;

a multitasking operating system including a plurality of protection domains from processes executing on the data processing system;

means, responsive to a keyboard interrupt, for preserving a system state during which a problem arose;

a keyboard device driver which executes in a protection domain having maximum access privileges to the system resources;

a debugging module installed in the keyboard device driver;

means responsive to user selection for invoking the debugging module; and means for executing the debugging module in the protection domain of the keyboard device driver for reviewing said system state and determining whether said keyboard is active after the occurrence of said problem.

5. A data processing system as set forth in claim 4, further comprising:

means for invoking the debugging module in response to a predetermined sequence of key strokes;

means responsive to user selection for retrieving a keyboard scan code;

means responsive to user selection for reading port data from a keyboard controller;

means responsive to user selection for retrieving shift states from a data area for the keyboard device driver; and means responsive to user selection for writing port data on the keyboard controller.

6. A data processing system as set forth in claim 4, further comprising:

means for retrieving data from a selected system register, port or area of a memory through the keyboard device driver;

means for placing the retrieved data into a keyboard input buffer; and means for displaying the contents of the keyboard input buffer to the user.

* * * * *